Dec. 15, 1964 N. K. LINDGREN 3,161,794
END BELLS FOR ELECTRIC MOTORS
Filed Jan. 19, 1961
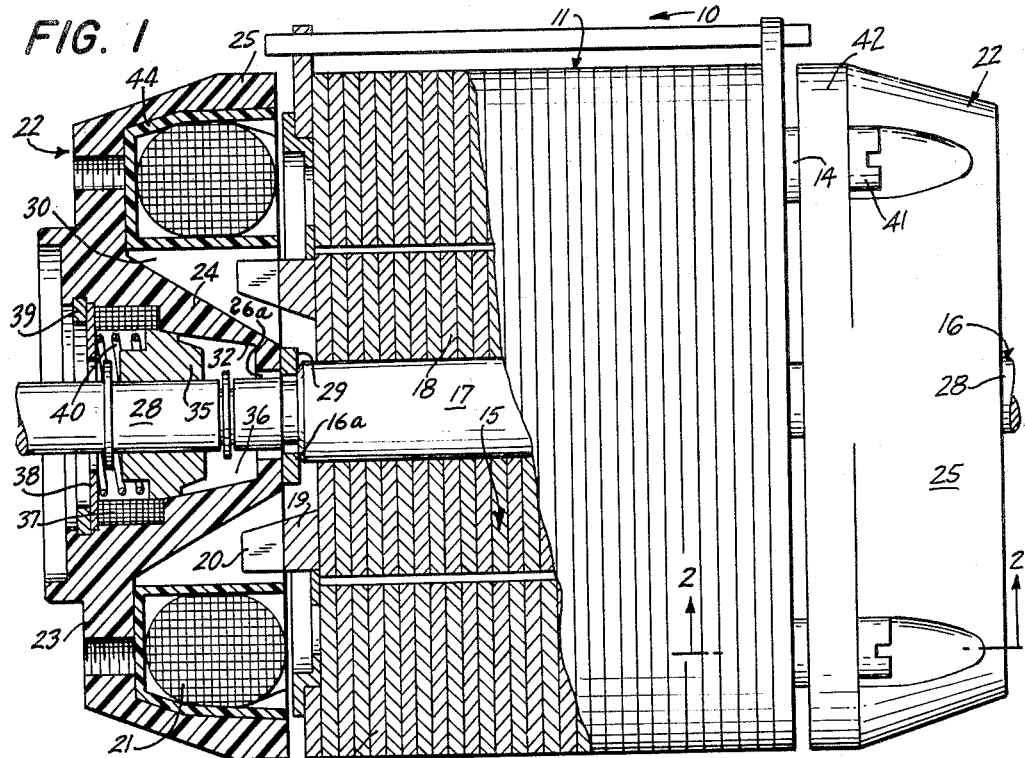
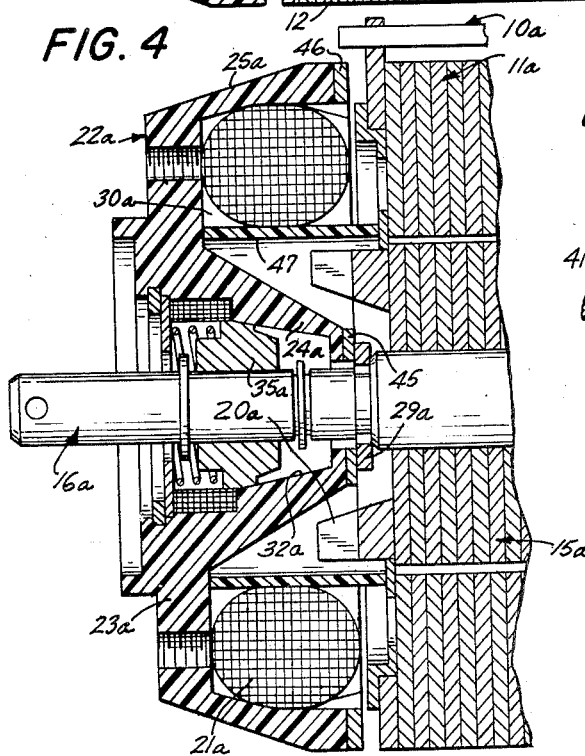
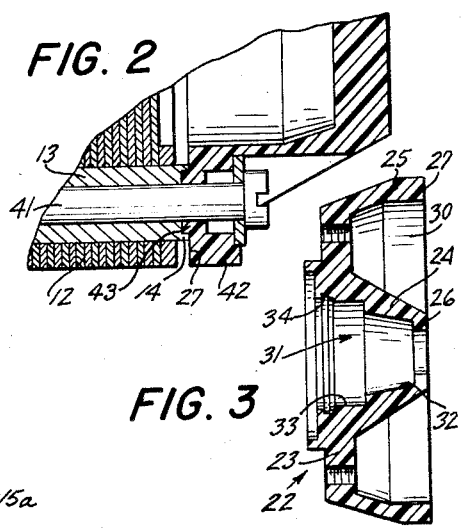
INVENTOR.
Nils Kauri Lindgren
BY
Edmund A. Ferander
his ATTORNEY

United States Patent Office 3,161,794
Patented Dec. 15, 1964

3,161,794
END BELLS FOR ELECTRIC MOTORS
Nils Kauri Lindgren, Stockholm, Sweden, assignor to Aktiebolaget Electrolux, Stockholm, Sweden, a corporation of Sweden
Filed Jan. 19, 1961, Ser. No. 83,815
Claims priority, application Sweden Oct. 1, 1960
15 Claims. (Cl. 310—89)

This invention relates generally to electric motors, and more particularly is directed to improvements in electric motors of the type including a stator which also forms the motor housing and which has bearing support members or brackets secured to its opposite ends to support the bearings in which the rotor shaft is rotatably mounted.

In motors of the described character, the bearing support members or brackets are usually in the form of generally spherical caps each having a peripheral portion secured to the adjacent end of the stator and a central portion which is situated furthest from the rotor, in the axial direction, and which carries the bearings rotatably supporting the rotor shaft. Such bearing support members or brackets disavantageously result in a motor having an undesirably large axial dimension, and they further have the disadvantage of requiring several manufacturing operations in order to fit the peripheral and central portions thereof to the stator and to the bearings for the rotor shaft.

Accordingly, it is the principal object of the invention to provide bearing support members or brackets for electric motors of the described character which avoid the above mentioned disadvantages of the existing arrangements.

In accordance with an aspect of the invention, each of the bearing support members or brackets includes annular peripheral and central portions joined by a radially extending, annular end wall and extending generally axially from the latter in the same direction, with the edge surfaces of the annular peripheral and central portions being adapted to engage the stator and rotor assembly, respectively, while an annular recess opening axially between the perhiperal and central portions is adpated to receive the usual head of the stator winding and a central recess surrounded by the annular central portion opens axially in the opposite direction and is adapted to receive a radial bearing in which the rotor shaft is rotatably mounted.

Further, it is a feature of each of the bearing support members or brackets embodying the invention that the edge surfaces of the annular peripheral and central portions intended for engagement or contact with the stator and rotor assembly, respectively, lie in the same radial plane, with the result that forces transmitted at such edge surfaces between the bearing support member or bracket and the stator and rotor will not cause warping and distortion of the bearing support member.

The above, and other objects, features and advantages of the invention, will be apparent in the following detailed description of illustrative embodiments thereof which is to be read in connection with the accompanying drawing forming a part hereof, and wherein:

FIG. 1 is an elevational view, partly broken away and in axial section, of an electric motor constructed in accordance with an embodiment of the present invention;

FIG. 2 is a fragmentary sectional view taken along the line 2—2 of FIG. 1;

FIG. 3 is an axial sectional view of one of the bearing support members or brackets included in the electric motor of FIG. 1; and FIG. 4 is a fragmentary axial sectional view of an electric motor having a modified form of bearing support member or bracket embodying the present invention.

Referring to the drawings in detail, and initially to FIG. 1 thereof, it will be seen that an electric motor embodying the invention, and there generally identified by the reference numeral 10, comprises a stator 11 formed by a stack of annular plates or laminations 12 which, as disclosed in detail in my co-pending application for United States Letters Patent identified as Serial No. 83,814, filed January 19, 1961, may have tubular spacers 13 (FIG. 2) extending through axially aligned openings formed in the plates 12 and having their opposite ends diametrically expanded, as at 14, so that the spacers 13 act as hollow rivets for axially securing together the parts of the stator.

The motor 10 has a rotor assembly 15 that includes a rotor shaft 16 having an enlarged diameter central portion 17 on which the usual rotor 18 is mounted within the stator 11. The rotor 18 has a short circuit ring 19 at each of its opposite ends, and blades 20 project generally axially from each ring 19 to provide a fan for cooling the motor winding, and particularly the adjacent head 21 of the stator winding which extends around the circular path of travel of the blades 20.

The illustrated electric motor 10 further comprises bearing support members or brackets 22 which, in accordance with the present invention, and as shown specifically in FIG. 3, each consist essentially of an annular, radially extending end wall 23, and annular central and peripheral portions 24 and 25, respectively, extending generally axially in the same direction from the inner and outer edges, respectively, of end wall 23. The central and peripheral portions 24 and 25 have free edge surfaces 26 and 27, respectively, which lie in the same radial plane. The edge surface 27 of peripheral portion 25 is intended to engage the adjacent end of the stator, particularly at the ends 14 of the spacers 13 which secure together the plates of the stator, as previously mentioned herein, while the free edge portion of the central annular portion 24 has a radially inward directed rim dimensioned to extend around the adjacent reduced diameter end portion 28 of rotor shaft 16 with a suitable clearance therebetween, as illustrated in FIG. 1, and its end surface 26 is intended to abut axially against a thrust bearing ring 29 which, in turn, bears axially against the radial shoulder 16a defined between the relatively large diameter central portion 17 and the adjacent reduced diameter end portion 28 of the rotor shaft.

It will be apparent that the described configuration of each bearing support member or bracket 22 provides an annular recess 30 defined between the annual central and peripheral portions 24 and 25 and opening axially in the direction away from end wall 23, that is, toward the adjacent end of the stator, so that the annular recess 30 is adapted to accommodate the head 21 of the stator winding and the fan blades 20, as shown in FIG. 1. Further, the central annular portion 24 of the bearing support member 22 envelops a central, stepped recess 31 increasing in diameter in the direction opposed to the opening of the recess 30 so that the annular space or recess defined between the end portion 28 of the rotor shaft extending through the bearing support member and the wall surface of recess 31 thereof opens axially in the direction away from the adjacent end of the stator. More specifically, as shown in FIG. 3, recess 31 preferably includes a tapered inner portion 32 increasing in diameter in the direction away from free edge surface 26, and an enlarged diameter, outer cylindrical portion 33 which, near its outer end, is provided with an annular groove 34 opening radially inward.

As shown in FIG. 1, a bearing 35 having the adjacent end portion 28 of the rotor shaft rotatably extending therethrough, and which is adapted to center the rotor assembly 15 with respect to the stator 11, that is, to transmit the radial loads, has a tapered outer surface corresponding to the taper of the inner portion 32 of recess 31 and is axially inserted in such inner portion 32 of the recess. The outer surface of bearing 35 is diametrically dimensioned so that the engagement of such outer surface with the tapered surface of inner recess portion 32 will prevent the bottoming of bearing 35 in the recess, thereby leaving a space 36 (FIG. 1) constituting a lubricating oil reservoir. It will be apparent that oil from the reservoir or space 36 can seep through the radial clearance 26a between the end portion 28 of the rotor shaft and the free edge of the central annular portion 24 for supplying lubricating oil between edge surface 26 and thrust bearing ring 29 in contact therewith. In FIG. 1 it will be seen that the end face or edge surface 26 of the central annular portion 24 is axially removed from the shaft bearing 35 and disposed between the latter and the central part 17, 18 of the rotor assembly 15.

A felt or other absorbent sleeve 37 impregnated with oil is disposed in the enlarged diameter cylindrical outer portion 33 of recess 31 to supply lubricant to the adjacent bearing 35, and such lubricating sleeve 37 is held in position by a washer 38 retained by a split ring 39 received in the groove 34. The washer 38 also acts as an abutment for the outer end of a helical spring 40 which engages, at its inner end, against the related bearing 35 for urging the latter axially into the tapered recess portion 32.

The bearing support members or brackets 22 are secured to stator 11, at the opposite ends of the latter, by bolts 41 which may extend through the tubular spacers 13 of the stator and through suitable openings provided in outwardly directed lugs 42 formed on each member 22 adjacent the edge of its peripheral annular portion 25 (FIGS. 1 and 2). As is described more fully in my aforementioned co-pending application for United States Letters Patent, identified as Serial No. 83,814, filed January 19, 1961, rotation and radial displacement of the bearing support members 22 relative to stator 11 may be prevented by providing the edge surface 27 of each bearing support member with projections 43 (FIG. 2) which are pressed, molded or struck from the material of the bearing support member into the adjacent expanded end 14 of the spacer 13 defining a recess for receiving such projection.

When the bearing support members or brackets 22 are formed of metal, an annular insulating hood 44 (FIG. 1), preferably formed of a plastic, is provided in surrounding relation to head 21 of the stator winding within the recess 30 of each bracket support member 22.

As in FIG. 4, an electric motor 10a which is generally similar to the previously described motor 10, and which has its several parts identified by the same reference numerals as those previously employed herein in connection with the description of the corresponding parts of the motor 10, but with the letter "a" appended thereto, may have its bearing support members or brackets 22a formed of a suitably reinforced rigid plastic. The bearing support members 22a formed of plastic preferably have the edges of the central and peripheral annular portions 24a and 25a, respectively, provided with metal insert rings 45 and 46, respectively, which form reinforcements at the locations of contact with the thrust bearing ring 29a of the rotor assembly 15a and with the adjacent end of the stator.

When the bearing support members 22a are formed of a plastic, such members are preferably manufactured by an accurate casting operation so as to avoid the necessity for additional machining of the surfaces of the bearing support member intended for engagement with the thrust and radial bearings and with the stator.

Further, if the bearing support members are formed of plastic, the insulating hood 44 extending around the head of the stator winding in motor 10 may be eliminated. However, in order to achieve better electromagnetic separation of the head 21a of the stator winding from the remainder of the motor 10a, a cylindrical sleeve 47 of insulating material is preferably inserted in the recess 30a so as to be surrounded by the head 21a and extends axially between end wall 23a of the bearing support member and the adjacent end of the stator.

Since the bearing support members 22 and 22a embodying the present invention define recesses opening in the opposite axial directions for respectively accommodating the head of the stator winding and the radial bearing for supporting the adjacent end of the rotor shaft, and such recesses are separated by the central annular portion 24 and 24a so that the recesses occupy substantially the same axial extent of the bearing support member, it is apparent that the latter may be relatively compact in the axial direction, thereby to substantially reduce the overall axial dimension of the motor. Such reduction of the axial dimension of the motor is of importance, for example, when the motors are to be used in small office machines or the like. Further, since the edge surfaces of the central and peripheral annular portions 24 and 25, and 24a and 25a, lie in the same radial plane, and are intended to engage the adjacent thrust bearing ring of the rotor assembly and the adjacent end of the stator, respectively, forces are also transmitted in the same radial plane between the bearing support member and the rotor assembly and stator, so that such forces will not cause warping or distortion of the bearing support members.

It is also to be noted that, in the described embodiments of the invention, the axial thickness of the thrust bearing rings 29 and 29a may be selected so as to provide the desired degree of axial play of the rotor assembly relative to the stator and the bearing support members secured to the latter, whereby more liberal manufacturing tolerances can be employed in the production of the motor, and the wider range of axial play resulting from such tolerances can be compensated for, at the time of assembly, merely by selecting the necessary thickness for the thrust bearing rings.

The engagement of each radial bearing 35 and 35a in a tapered portion 32 and 32a of the related recess under the influence of a spring acting yieldably on the bearing further makes it possible to employ liberal manufacturing tolerances and facilitates the assembly of the motor, as the radial bearing is automatically urged into close engagement with the tapered wall surface, thereby further substantially reducing the cost of manufacture.

In view of the foregoing, it will now be understood that an improved electric motor 10 has been provided having a stator 11 and a rotor assembly 15 rotatable on shaft 16 about an axis extending through the stator. The rotor assembly 15 includes a central part defined by the rotor 18 and shaft portion 17, and shaft end portions 28 project axially from the opposite ends of the central part 17 and 18. The central part 17 and 18 of the rotor assembly at each end thereof includes a first surface 16a adjacent and transverse to the axis of rotation of the rotor assembly 15. The stator 11 at each end thereof includes a second surface 14 which is radially removed from the first surface 16a and transverse to the axis of rotation of the rotor assembly 15.

Bearing support members 22 are provided at opposite ends of the stator 11 and rotor assembly 15. Each bearing support member 22 includes axially extending central and peripheral hollow portions 24 and 25 of annular form respectively terminating at third and fourth surfaces 26 and 27 which are disposed in the same radial plane normal or perpendicular to the axis of rotation of the rotor assembly 15. It will be seen that each bearing support member 22 is formed from a single part in which the radially directed end wall 23 and axially extending central and peripheral hollow portions 24 and 25 are joined to one another.

As seen in FIGS. 2 and 3, the third surfaces 26 coact with the first transverse surfaces 16a and the fourth transverse surfaces 27 coact with the second transverse surfaces 14. The central hollow portions 24 define central recesses 31 through which the shaft end portions 28 project axially from the central part 17 and 18 of the rotor assembly 15. The central recesses 31 open axially in directions away from the ends of the stator 11. Bearings 35 are provided in the central recesses 31 for rotatably supporting the shaft end portions 28.

The washer 38, split ring 39 and helical spring 40 coact with the bearing support members 22 and the bearings 35 for removably positioning the latter in the central hollow portions 24. It will be seen that the washer 38, split ring 39 and helical spring 40 are accessible at the openings of the central recesses 31 to remove the bearings 35 from the recesses while the axially extending central and peripheral hollow portions 24 and 25 remain fixed at the ends of the stator 11 and rotor assembly 15 by the bolts 41.

Although illustrative embodiments of the invention have been described in detail herein with reference to the accompanying drawing, it is to be noted that the invention is not limited to those precise embodiments, and that various changes and modifications may be effected therein without departing from the scope or spirit of the invention, except as defined in the appended claims.

I claim:

1. In an electric motor having a stator with a winding that includes projecting heads at the opposite ends thereof, and a rotor assembly including a central part rotatable in said stator and a shaft projecting axially from the opposite ends of the central part; the combination of bearing support members disposed at the opposite ends of said stator, at least one of said bearing support members including an annular radially directed end wall and peripheral and central annular portions which extend axially from the outer and inner edges of said end wall toward one end of the stator and respectively terminate at free end edges which are disposed in the same radial plane normal to the axis of rotation of said rotor assembly, said one bearing support member being formed from a single part in which said radially directed end wall and said peripheral and central annular portions are joined to one another, said end wall and said peripheral and central annular portions defining an annular recess opening axially toward the one end of the stator and receiving the projecting heads at one end of the stator winding, means securing the free end edge of said peripheral annular portion to the one end of the stator, the free end edge of said central annular portion defining a central annular opening through which the rotor shaft extends and said central annular portion defining a central recess receiving the shaft and opening axially in a direction away from the stator, radial bearing means in the central recess rotatably supporting said shaft relative to said one bearing support member, means coacting with said one bearing support member and said radial bearing means for removably positioning the latter in the central recess of said central annular portion, said last-mentioned means being accessible at the opening of the central recess to remove said bearing means from the central recess while said end wall and said peripheral and central annular portions of said one bearing support member remain positioned at the one end of the stator by said securing means, said shaft having a radial shoulder, and thrust bearing means which is disposed on said shaft at said radial shoulder and axially engaged by the free end edge of said central annular portion, and the free end edge of said central annular portion being axially displaced from said radial bearing means and disposed between the latter and the central part of said rotor assembly.

2. The combination set forth in claim 1 in which said shaft includes a first portion forming a component of the central part of the rotor assembly and a second end portion of smaller diameter extending from said first portion, the juncture of the first and second portions of said shaft defining said radial shoulder on said shaft, and said radial bearing means comprising a bearing ring on the second portion of said shaft at the juncture of the first and second portions of said shaft, and said bearing ring having opposing sides axially spaced from one another and one of which faces said radial shoulder and the other of which faces the free end edge of said central annular portion of said one bearing support member.

3. The combination set forth in claim 2 in which the central recess defined by said central annular portion of said one bearing support member includes a space between said radial bearing means and said central opening at the free edge of said central annular portion which defines a reservoir for holding a body of lubricant which can seep through said central opening around said shaft to lubricate the coacting surfaces of the free end edge of said central annular portion and said bearing ring.

4. The combination set forth in claim 3 in which the central recess of said central annular portion is formed with an enlarged outer portion at the open end thereof, and a hollow absorbent sleeve which is impregnated with lubricant and snugly fits in the outer portion of said central recess for lubricating said radial bearing means removably positioned therein by said removable means accessible at the opening of the central recess.

5. In an electric motor having a stator and a rotor assembly rotatable about an axis extending through said stator, said rotor assembly including a central part and a shaft projecting axially from the opposite ends of the central part, the central part of said rotor assembly at one end thereof having a first surface adjacent and transverse to the axis of rotation of said rotor assembly, said stator at one end thereof having a second surface radially removed from the first surface and transverse to the axis of rotation of said rotor assembly, and bearing support members disposed at opposite ends of said stator, at least one of said bearing support members disposed at the one end of said stator and the one end of said rotor assembly having axially extending central and peripheral hollow portions of annular form respectively terminating at third and fourth surfaces which are disposed in the same radial plane normal to the axis of rotation of said rotor assembly, said one bearing support member being formed from a single part in which said axially extending central and peripheral hollow portions are joined to one another, said third surface coacting with said first transverse surface and said fourth transverse surface coacting with said second transverse surface, said central hollow portion defining a central recess through which said shaft projects axially from the central part of said rotor assembly at the one end thereof, the central recess opening axially in a direction away from the one end of said stator, bearing means in the central recess for rotatably supporting said shaft, means coacting with said one bearing support member and said bearing means for removably positioning the latter in the central recess of said central hollow portion, said last-mentioned means being accessible at the opening of the central recess to remove said bearing means from the central recess while said axially extending central and peripheral hollow portions of said one bearing support member remain disposed at the one end of said stator and the one end of said rotor assembly, and the third surface of said central hollow portion of said one bearing support member being axially displaced from said bearing means and disposed between the latter and the central part of said rotor assembly.

6. An electric motor as set forth in claim 5 in which said shaft is provided with a radial shoulder at the one end of said central part which defines the first transverse surface on said rotor assembly, and said shaft having thrust bearing means at the vicinity of the radial shoulder and through which the third surface coacts with the first transverse surface defined by said radial shoulder.

7. An electric motor as set forth in claim 5 in which said one bearing support member is formed of insulating material, said annular central and peripheral portions of said one bearing support member having metal inserts fixed thereto which define the third and fourth surfaces which are disposed in the same radial plane normal to the axis of rotation of said rotor assembly.

8. In an electric motor having a stator and a rotor assembly including a central part rotatable in said stator and a shaft projecting axially from the opposite ends of the central part; the combination of bearing support members disposed at the opposite ends of said stator, at least one of said bearing support members disposed at one end of said stator and at one end of the central part of said rotor assembly having concentric axially extending central and peripheral annular portions respectively terminating at free edge surfaces which are disposed in the same radial plane normal to the axis of rotation of said rotor assembly, said one bearing support member being formed from a single part in which said central and peripheral annular portions are joined to one another, the free edge surface of said peripheral annular portion being engageable axially against the one end of said stator, thrust bearing means on said shaft at the one end of the central part of said rotor assembly, said thrust bearing means being engageable axially by the free edge surface of said central annular portion, said central annular portion defining a central recess through which said shaft projects axially from the one end of the central part of said rotor assembly, the central recess opening axially in a direction away from said stator, second bearing means in the central recess for rotatably supporting said shaft, means coacting with said one bearing support member and said second bearing means for removably positioning the latter in the central recess of said central annular portion, said last-mentioned means being accessible at the opening of the central recess to remove said second bearing means from the central recess while said central and peripheral annular portions of said one bearing support member respectively remain engageable with said thrust bearing means and the one end of said stator, and the free edge surface of said central annular portion being axially displaced from said second bearing means and disposed between the latter and said thrust bearing means.

9. An electric motor as set forth in claim 8 in which said stator is provided with a winding including projecting heads at opposite ends thereof, the central and peripheral annular portions of said one bearing support member defining an annular space therebetween opening axially toward the one end of said stator, and a part of annular form which is disposed in the annular space of said one bearing support member and formed of insulating material, said part being U-shaped in section and opening axially toward the one end of said stator and receiving the projecting heads at the one end of said stator winding.

10. An electric motor as set forth in claim 8 in which said stator is provided with a winding including projecting heads at opposite ends thereof, the central and peripheral annular portions of said one bearing support member defining an annular space therebetween opening axially toward the one end of said stator, a cylindrical wall of insulating material extending axially in the annular space of said one bearing support member, and an annular recess in the space which is defined by the peripheral annular portion and the cylindrical wall and receives the projecting heads at one end of said stator winding.

11. In an electric motor having a stator and a rotor assembly including a central part rotatable in said stator and a shaft projecting axially from the opposite ends of the central part; the combination of bearing support members disposed at the opposite ends of said stator, at least one of said bearing support members disposed at one end of said stator and at one end of the central part of said rotor assembly having concentric central and peripheral annular portions, said one bearing support member being formed from a single part in which said central and peripheral annular portions are joined to one another, said stator having a winding including projecting heads at the opposite ends thereof, the central and peripheral annular portions of said one bearing support member respectively terminating at free end surfaces which are disposed in the same radial plane normal to the axis of rotation of said rotor assembly and define an annular space therebetween opening axially toward one end of said stator and receiving the projecting heads at one end of the stator winding, the edge surface of said peripheral annular portion being engageable against the one end of said stator, thrust bearing means on said shaft at the one end of the central part of said rotor assembly, said thrust bearing means being engageable axially by the free edge surface of said central annular portion, said central annular portion defining a central recess through which said shaft projects axially from the one end of the central part of said rotor assembly, the central recess opening axially in a direction away from the one end of said stator, second bearing means in the central recess for rotatably supporting said shaft, means coacting with said one bearing support member and said second bearing means for removably positioning the latter in the central recess in said central annular portion, said last-mentioned means being accessible at the opening of the central recess to remove said second bearing means from the central recess while said central and peripheral annular portions of said one bearing support member respectively remain engageable with said thrust bearing means and the one end of said stator, and the free edge surface of said central annular portion being axially displaced from said second bearing means and disposed between the latter and said thrust bearing means.

12. An electric motor as set forth in claim 11 in which said central annular portion of said one bearing support member and said second bearing means associated therewith is so constructed and arranged that a region of said central annular portion between the free edge surface at its inner end and the opposite open end thereof serves as a stop which is engaged by said second bearing means in the central recess whereby the latter is axially displaced from the free edge surface of the central annular portion.

13. An electric motor as set forth in claim 12 in which the central recess includes a space between the free edge surface of said central annular portion and the second bearing means which defines a reservoir for holding a body of lubricant to supply lubricant to said thrust bearing means.

14. An electric motor as set forth in claim 12 in which said central annular portion includes a zone which is tapered and increases in diameter in an axial direction away from its free edge surface, the tapered zone defining the stop which is engaged by said second bearing means, and said means coacting with said one bearing support member and said second bearing means for removably positioning the latter in said central annular recess against said stop including a resilient member.

15. An electric motor as set forth in claim 12 in which the region of said central annular portion of said one bearing support member serving as the stop is of smaller diameter than the diameter of a section thereof extending axially from such region toward the open end of said central annular portion, a hollow sleeve of absorbent material which is impregnated with lubricant and snugly positioned in the central recess within the aforementioned section of said central annular portion to lubricate said second bearing means.

References Cited in the file of this patent

UNITED STATES PATENTS

| | | |
|---|---|---|
| 2,792,512 | Koch | May 14, 1957 |
| 2,817,026 | Robinson et al. | Dec. 17, 1957 |
| 2,845,552 | Robinson | July 29, 1958 |
| 2,894,156 | Kent | July 7, 1959 |
| 3,002,794 | Bluemink | Oct. 3, 1961 |

FOREIGN PATENTS

| | | |
|---|---|---|
| 561,741 | Belgium | Nov. 14, 1957 |
| 341,556 | Switzerland | Nov. 30, 1959 |